United States Patent
Nagashima et al.

[11] Patent Number: 6,117,221
[45] Date of Patent: Sep. 12, 2000

[54] EMULSION INK FOR STENCIL PRINTING

[75] Inventors: Satoshi Nagashima; Hiromichi Yamada; Shoichi Ikejima, all of Inashiki-gun, Japan

[73] Assignee: Riso Kagaku Corporation, Tokyo, Japan

[21] Appl. No.: 09/337,503

[22] Filed: Jun. 22, 1999

[30] Foreign Application Priority Data

Jun. 23, 1998 [JP] Japan .................................. 10-191004

[51] Int. Cl.$^7$ .................................................. C09D 11/02
[52] U.S. Cl. ........................ 106/31.26; 106/236; 106/241
[58] Field of Search ................................. 106/31.26, 236, 106/241

[56] References Cited

U.S. PATENT DOCUMENTS

| | | | |
|---|---|---|---|
| 4,576,647 | 3/1986 | Matsushita | 106/241 |
| 4,976,785 | 12/1990 | Nakano et al. | 106/241 |
| 5,389,130 | 2/1995 | Batlaw et al. | 106/31.26 |
| 5,427,615 | 6/1995 | Jordan | 106/236 |
| 5,708,078 | 1/1998 | Bender et al. | 106/241 |
| 5,800,599 | 9/1998 | Asada | 106/31.26 |
| 5,853,466 | 12/1998 | Matsuura et al. | 106/31.26 |
| 5,880,214 | 3/1999 | Okuda | 106/31.26 |
| 5,902,388 | 5/1999 | Matsuura et al. | 106/31.26 |

FOREIGN PATENT DOCUMENTS

| | | |
|---|---|---|
| 5-117564 | 5/1993 | Japan . |
| 6-293873 | 10/1994 | Japan . |

OTHER PUBLICATIONS

Derwent abstract of JP05/117564, May 1993.
Derwent abstract of JP06/293873, Oct. 1994.
Patent Abstracts of Japan, vol. 1995, No. –, Feb. 28, 1995 (Feb. 28, 1995) & JP 06 293873 A (Toyo Ink Mfg Co Ltd), Oct. 21, 1994 (Oct. 21, 1994).
Patent Abstracts of Japan vol. 018, No. 430 (C–1236), Aug. 11, 1994 (Aug. 11, 1994) & JP 06 128518 A (Tohoku Ricoh Co Ltd), May 10, 1994 (May 10, 1994).
Patent Abstracts of Japan vol. 012, No. 209 (C–504), Jun. 15, 1988 (Jun. 15, 1988) & JP 63 010675 A (Nippon Paint Co Ltd), Jan. 18, 1988 (Jan. 18, 1988).

*Primary Examiner*—Helene Klemanski
*Attorney, Agent, or Firm*—Pillsbury Madison & Sutro LLP

[57] ABSTRACT

There is provided a water-in-oil (W/O) emulsion ink for stencil printing having an oil phase and a water phase, the oil phase containing a reaction product of an alkyd resin or a rosin-modified resin with an aluminum chelate compound or an aluminum alcoholate. Preferably, the reaction is carried out by heating the aluminum chelate compound or aluminum alcoholate with the alkyd resin or rosin-modified resin to a temperature enough to lower the acid value of the resin to 10 or less, and the reaction is carried out in the presence of a higher fatty acid or a higher alcohol in an amount of 0.5–2.5 mols per 1 mol of on the aluminum chelate compound or aluminum alcoholate. This emulsion ink is improved in storage stability and inhibited from increase of viscosity of the ink after the ink is left, and restarting of printing after suspension of operation of the printing machine can be satisfactorily performed.

12 Claims, No Drawings

EMULSION INK FOR STENCIL PRINTING

The present invention relates to a water-in-oil (W/O) emulsion ink for stencil printing, and more specifically relates to a water-in-oil (W/O) emulsion ink for stencil printing which is high in storage stability and inhibited from increase in viscosity seen on a surface of ink when the ink is left to stand.

Stencil printing has become easy and quick easy to provide prints of high quality since digital image processing was realized by employment of a thermal printing head that perforates heat-sensitive stencil sheets. Thus, the stencil printing system is also increasingly recognized to be useful as a terminal for information processing systems.

One of the features of stencil printing system is easiness and simplicity of operation requiring no expert operators as compared with printing systems such as offset printing, gravure printing, and letterpress printing. That is, the advantage is that the stencil printing system requires no skill for operation and no complicated operations such as cleaning after use.

The stencil printing is not often performed on coated papers or art papers but mainly on papers of high absorptivity such as groundwood papers and woodfree papers. Therefore, emulsion type inks that are fixed by permeation drying are used in many cases(JP-A-51-104907 and JP-A-54-23601), ever though some proposals have been made of ultraviolet-curable type inks (JP-A-1-318073 and JP-A-2-41376).

According to the heat-sensitive perforating method using a thermal printing head mentioned above, size of perforations made in stencil sheets is uniformed so that a transfer amount of ink can be more easily controlled as compared with previous methods using infrared rays or xenon flash as energy sources. For this reason, occurrence of troubles such as setoff and blurring caused by transfer of too much amount of inks is diminished, and image quality is markedly improved.

Although printing density, fixability, blotting, setoff, and blurring of ink, which are indicators of image quality, have very close relation with the transfer amount of ink, they are also greatly affected by viscosity among the properties of ink. Therefore, in designing inks for stencil printing, it is strongly desired that viscosity of the inks is made stable.

In water-in-oil (W/O) emulsion inks for stencil printing, an alkyd resin or a rosin-modified resin is often added to the oil phase in order to improve printability. However, these resins are high in polarity and, sometimes, damage the storage stability of emulsion. As methods for improving the stability of emulsion, there have been proposed a method in which particle size of emulsion is reduced (JP-A-7-179799), a method in which a water-soluble polymer is added to the water phase (JP-B-44-2165), a method in which a metal salt is added to the water phase (JP-A-7-150091), and a method in which selected active agents are used (JP-A-2-209976, JP-A-6-145576, JP-A-6-145577, JP-A-6-329970, and JP-A-7-157701), and further proposed are methods in which viscosity of the oil phase is increased, for example, by forming a three-dimensional structure in the oil phase (JP-A-4-233980), and adding a resin and a gelling agent for the resin to the oil phase (JP-A-5-117564).

Moreover, in order to improve pigment dispersibility in the oil phase by modifying the surface of pigments to have oleophilicity, it is proposed to add an aluminum chelate compound or an aluminum alcoholate to the oil phase (JP-A-293873 and JP-A-6-128518), but this is still insufficient to improve temperature dependency of viscosity or storage stability of inks.

Furthermore, the above proposals only aim at inhibiting the reduction of ink viscosity caused by progress of coalescence of the water phase with lapse of time after preparation of ink.

As a result of intensive research conducted by the inventors, it has been found that when a reaction product of an aluminum chelate compound or an aluminum alcoholate with an alkyd resin or a rosin-modified resin is allowed to be present as a resinous component in the oil phase of water-in-oil (W/O) emulsion inks for stencil printing, inks low in temperature dependency of viscosity and excellent in storage stability can be obtained.

Thus, in one aspect of the present invention, is provided a water-in-oil (W/O) emulsion ink for stencil printing having an oil phase and a water phase, in which the oil phase contains a reaction product of an aluminum chelate compound or an aluminum alcoholate with an alkyd resin or a rosin-modified resin.

The aluminum chelate compound or aluminum alcoholate reacts with —OH group or —COOH group of the alkyd resin or rosin-modified resin to produce a modified derivative of the resin thereby resulting in lowering of the polarity of the resin. Therefore, progress of this reaction can be confirmed by seeing the decrease of acid value of the alkyd resin or rosin-modified resin. Especially, when the reaction is allowed to progress until acid value of the resin decreases to 10 or less, an excellent emulsion stability is attained, and this is preferred.

That is, in another aspect of the present invention, is provided a water-in-oil (W/O) emulsion ink for stencil printing having an oil phase and a water phase, in which the oil phase contains an alkyd resin or rosin-modified resin having an acid value of 10 or less. The alkyd resin or rosin-modified resin having an acid value of 10 or less can be obtained by reacting an alkyd resin or a rosin-modified resin with an aluminum chelate compound or an aluminum alcoholate to modify the resin.

Similarly, in still another aspect of the present invention, is provided a varnish for stencil printing inks, which comprises a solvent containing an alkyd resin or rosin-modified resin having an acid value of 10 or less. A water-in-oil (W/O) emulsion ink for stencil printing low in temperature dependency of viscosity and excellent in storage stability can be obtained by using said varnish as the oil phase of the ink.

Since alkyd resins and rosin-modified resins are relatively high in polarity and good in wettability with pigments, they have been used as resins for printing inks. Being different from inks of high viscosity such as those for offset printing, inks for stencil printing are prepared so that they have a low viscosity to satisfy the desired stencil printability, and, hence, as the resinous components, those of relatively low molecular weight are selected. However, with decrease of molecular weight of the resins, the number of —OH groups or —COOH groups contained in unit molecule increases and the polarity also increases to cause deterioration of stability of the emulsion. Furthermore, if an ink of emulsion type is prepared using the resin as it is, properties of the ink are directly affected by variations of such properties as polarity of the resin, solubility of the resin in the solvent, and temperature dependency of viscosity of the resin. These variations are caused by residual amount of unreacted materials or distribution of the low-molecular weight components when the resin is produced. Thus, preparation of emulsion inks of constant quality is difficult.

In the present invention, —OH group or —COOH group of an alkyd resin or rosin-modified resin is reacted with an aluminum chelate compound or an aluminum alcoholate to reduce the polarity of the resin in the oil phase. Therefore, storage stability of the emulsion can be improved. Furthermore, it is considered that this reaction proceeds preferentially with the unreacted materials or low-molecular weight components in the resin, and the influence of the unreacted materials or low-molecular weight components in the resin exerted on the emulsion can be diminished and it becomes easy to prepare emulsion inks having a constant quality irrespective of the variation of the properties of the resin. Besides, it is considered that since aluminum has a trifunctional group, the reaction product in the form of an aluminum compound which has captured one or two mols of resinous component per mol is oriented at the interface between the oil phase and the water phase of the emulsion, which contributes to increase of interfacial strength.

In the present invention, the resinous components are preferably products obtained by reacting an aluminum chelate compound or an aluminum alcoholate with an alkyd resin or a rosin-modified resin in the presence of a higher fatty acid or a higher alcohol. Since aluminum of the aluminum chelate compound or aluminum alcoholate has a trifunctional group, when it is reacted with an alkyd resin or a rosin-modified resin in a system containing a higher fatty acid or a higher alcohol, the higher fatty acid or higher alcohol which is lower in molecular weight than the resin preferentially reacts with aluminum. As a result, the reaction product is inhibited from having a very high molecular weight and decreasing solubility, since the reaction product takes in, through aluminum, the oleophilic component of relatively short carbon chain length and of uniform molecular weight. For this reason, oleophilicity of the reaction product is kept uniform and enhanced, resulting in excellent solubility of the reaction product in the solvent used in preparation of the ink.

Thus, increase of viscosity of the oil phase with lapse of time, which occurs owing to localization of the pigment and the resin in the surface layer of the ink when the ink is left to stand, can be prevented. Especially, in the state of the ink being left in the drum while the printing machine is not operated, not only the volatile component is evaporated from the ink, but also the pigment and the resin are localized on the surface layer of the ink due to the phenomenon of diffusion of the solvent into the substrate of the stencil sheet, resulting in increase of ink viscosity and lowering of the initial printing density. Even in such a case, since the alkyd resin or the rosin-modified resin bonds to the higher fatty acid or the higher alcohol through aluminum, the resin layer adsorbed to the surface of the pigment is relatively small in molecular weight and affinity with the solvent is ensured, and, hence, increase of viscosity of the ink surface with lapse of time can be inhibited and good start of printing can be attained ever after the ink is left to stand, resulting in reduction of loss of printing paper.

The present invention will be explained in more detail below.

The emulsion ink of the present invention can comprise about 10–50% by weight of an oil phase and about 90–50% by weight of a water phase, and can be prepared by adding dropwise the water phase to the oil phase with stirring to perform emulsification.

The water phase in the present invention can be prepared by suitably mixing and dispersing water, an electrolyte, a water-evaporation inhibitor, a water-soluble polymer, a fungicide, a preservative, a pH adjustor, an antifreezing agent, a colorant such as a pigment and a dye, etc. in an ordinary manner. The oil phase in the present invention can be prepared by mixing, in an ordinary manner, an alkyd resin or rosin-modified resin which has reacted with an aluminum chelate compound or an aluminum alcoholate, or a varnish containing the resin, if necessary, with a solvent, and, in addition, with a colorant such as a pigment and a dye, other resins, an antioxidant, and an extender pigment that is used for control of fluidity. These components of ink must not hinder the formation of emulsion.

The aluminum chelate compounds used in the present invention can be selected, for example, from those represented by the following formulas:

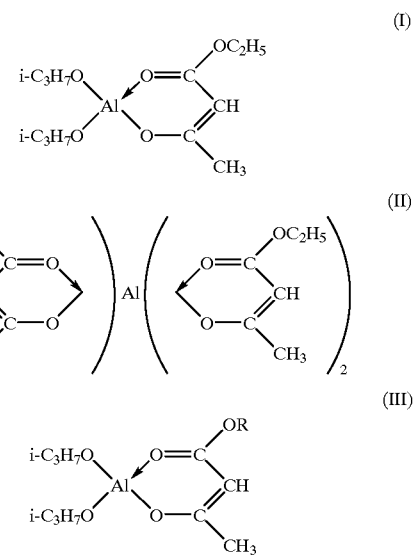

(wherein R denotes an alkyl group). In these compounds, the alkoxy group or chelate group bonding to aluminum undergoes an exchange reaction with an alcohol or reacts with various fatty acids to form an aluminum salt, and thus they can react with —OH group or —COOH group of 3 mols at maximum per mol. Among the above compounds, ethylacetoacetate. aluminum-diisopropylate represented by the formula (I) is preferred because of its proper reactivity.

The aluminum alcoholates used in the present invention are represented by the formula $Al(OR)_3$ (wherein R denotes an alkyl group and each of the Rs may be the same or different), and, like the aluminum chelate compounds, the portion of (OR) undergoes exchange reaction with alcohols or reacts with various fatty acids to form aluminum salts. Thus, the aluminum alcolates can react with —OH group or —COOH group in of 3 mols at maximum per mol. As examples of the aluminum alcoholates, mention may be made of aluminum isopropylate, mono-sec-butoxyaluminum diisopropylate, aluminum sec-butylate, and aluminum ethylate. However, since aluminum alcolates are higher in reactivity than aluminum chelate compounds, care must be taken in using the aluminum alcoholates.

The reaction of the aluminum chelate compound or aluminum alcoholate with the alkyd resin or rosin-modified resin can be allowed to proceed by mixing and heating them. This reaction is preferably carried out in the presence of a higher fatty acid or a higher alcohol, and the amount of the higher fatty acid or higher alcohol added is preferably 0.5–2.5 mols for 1 mol of the aluminum chelate compound or aluminum alcoholate. Aluminum is trifunctional, and the higher fatty acid or higher alcohol is taken in the reaction system during the reaction of the aluminum chelate compound or aluminum alcoholate with the alkyd resin or rosin-modified resin, whereby the reaction product is inhibited from increasing its molecular weight too much and decreasing solubility of the resin. Namely, the oleophilic component, which is relatively short in carbon chain length and uniform in molecular weight, is taken in by the resin through the aluminum. Therefore, the reaction product is increased in oleophilicity, and can be dissolved well in the solvent in preparation of ink. Further, since the addition amount of the higher fatty acid or higher alcohol is limited to up to 2.5 mols, aluminum is expected to capture low molecular weight components contained in the alkyd resin or rosin-modified resin, particularly, components that remain unreacted in preparation of the resin. These components are supposed to be high in reaction rate because of the low molecular weight. As a result, it is presumed that the low-molecular weight components contained in the resin decreases, polarity of the reaction product is stabilized, and stability of the emulsion is improved.

In order that the reaction proceeds uniformly, the reaction is preferably carried out in a suitable solvent. It is advantageous that the solvent used for the reaction is the same as a solvent used as the oil phase component of the ink, because after completion of the reaction the reaction product containing the solvent can be used, as it is, as a varnish for the oil phase component of the present invention. The progress of this reaction can be confirmed by decrease of acid value of the alkyd resin or rosin-modified resin. This reaction can usually be performed at a reaction temperature of 100–200° C. for a reaction time of 15–200 minutes. Preferably, the reaction is allowed to proceed until the acid value of the alkyd resin or rosin-modified resin decreases to 10 or less. For this purpose, the reaction temperature is preferably 120–190° C., especially preferably 170–180° C., and the reaction time is preferably 30–60 minutes. However, naturally the reaction temperature must be set considering the heat decomposition characteristics of the resin used.

The alkyd resin is one which is produced from an oil and fat, a polybasic acid and a polyhydric alcohol. The rosin-modified resin is suitably rosin-modified maleic resin, rosin-modified phenolic resin and the like. According to the present invention, the alkyd resin or rosin-modified resin is modified by the reaction with the aluminum chelate compound or aluminum alcoholate. As a result, the resin is lowered in polarity, and is modified until the acid value lowers to preferably 10 or less. Thus, dispersion of pigments, printability of inks and fixability of pigments can be satsifactorily exhibited without causing deterioration in storage stability of the emulsion ink.

The higher alcohols include, for example, cetyl alcohol, stearyl alcohol, isostearyl alcohol, oleic alcohol, etc. The higher fatty acids include, for example, palmitic acid, stearic acid, isostearic acid, oleic acid, linolic acid, linoleic acid, etc.

The solvents used for the oil phase in the present invention include, for example, petroleum solvents such as olefinic hydrocarbons, liquid paraffin, and aromatic hydrocarbons, vegetable fats such as coconut oil and palm oil, vegetable oils such as olive oil, castor oil, and linseed oil, synthetic oils, etc. These solvents may be used each alone or in admixture of two or more. Amount of the solvent added can be optionally selected so as to adjust the viscosity of the oil phase to the desired value. At present, it is preferred to select solvents considering the content of aromatic components or that of volatile components for assurance of safety. Moreover, by selecting solvents taking into consideration solubility of the resin used, the temperature dependency of viscosity can be lowered, and thus the system can be stabilized because separation of the solvent hardly occurs ever when the ink is left in the printing machine. Alternatively, a dissolving aid may be added in order to increase solubility.

The active agents used in the present invention include, for example, anionic surface active agents such as metallic soaps, higher alcohol sulfates, and polyoxyethylene adduct sulfates, cationic surface active agents such as primary to tertiary amine salts and quaternary ammonium salts, non-ionic surface active agents such as esters of polyhydric alcohols with fatty acids, polyoxyethylene-ethers of fatty acids, polyoxyethylene-ethers of higher alcohols, alkyl-phenol. polyoxyethylene-ethers, sorbitan fatty acid esters, polyglycerin fatty acid esters, polyoxyethylene-ethers of castor oil, polyoxyethylene-polyoxypropylene alkyl ethers, and alkylolamides of fatty acids. These can be used each alone or in combination of two or more. Amount of the active agents is determined considering the molar concentration of the active agents, the area of interface between the water phase and the oil phase, and partially the area of interface between the oil phase and the solid such as a pigment.

As colorants used in the present invention, mention may be made of, for example, organic pigments such as insoluble azopigments, solubleazopigments, PhthalocyanineBlue, dyeing lakes, isoindolinones, quinacridone, dioxazine violet, and Perinone-Perylene, inorganic pigments such as carbon black and titanium dioxide, and synthetic dyes such as disperse dyes, acid dyes, reactive dyes, direct dyes and vat dyes. These colorants may be used each alone or in admixture of two or more.

Furthermore, the oil phase in the present invention can additionally contain pigment dispersants, antioxidants, compounds mainly composed of waxes as aids for adjusting fluidity, and the like in such a range as not hindering the formation of emulsion and not damaging the stability of the emulsion.

Hereinafter, the present invention will be explained in more detail by way of the following examples. However, it should be understood that the present invention is not limited to these examples. In the following examples, the term "part(s)" means "part(s) by weight".

EXAMPLE 1

3.0 Parts of AF-5 SOLVENT (manufactured by Nippon Oil Co., Ltd.) as a solvent for adjustment of viscosity was added to 10.5 parts of an alkyd resin having a weight-average molecular weight of 3000 and a viscosity of 3700 cP (23° C.), followed by stirring with heating to 170° C. (the initial heating temperature). The solvent was added at this stage in order to prevent a heterogeneous reaction of aluminum chelate compound with the resin. Further, an aluminum chelate compound ALCH (ethylaceto acetate-aluminum-diisopropylate manufactured by Kawaken Fine Chemical Co., Ltd.) was added thereto so that the proportion of the aluminum chelate compound was 3 wt % based on the resin, followed by stirring with heating under the temperature condition of 170–180° C. for 30 minutes to perform the reaction to obtain a varnish. After the reaction, the varnish was gradually cooled and, then, 10.0 parts of AF-5 SOLVENT was added to the varnish to adjust the viscosity. Then, 2 parts of sorbitan monooleate as a surface active agent was added to the varnish, and 7 parts of a pigment (furnace carbon black) was dispersed therein to obtain an oil phase.

Furthermore, to this oil phase was added 67.5 parts in total of a water phase comprising 60 parts of deionized water and 7.5 parts of ethylene glycol, and, thus, emulsification was carried out to obtain a water-in-oil emulsion ink for stencil printing.

Viscosity of the varnish was measured by Vismetron viscometer VDA manufactured by Shibaura System Co., Ltd. with a No.3 rotor at 23° C.

Viscosity of the emulsion was measured by a speed control type rheometer CV-1D manufactured by HAAKE Co., Ltd. under the conditions of a shear rate of 40 [1/sec] and 23° C. The measured value was expressed by Pa·s.

Acid value is the amount (mg) of potassium hydroxide necessary to neutralize a free fatty acid contained in 1 g of an objective material, but in the present invention, the acid value of the resin or that of the reacted resin was calculated by the following formulas from the measured acid value of varnish comprising a solvent containing the resin or a solvent containing the reaction product of aluminum chelate compound or aluminum alcoholate and resin, with a proviso that the acid value of the solvent is assumed to be 0.

Acid value of resin=Acid value of varnish/proportion of resin in varnish.

Acid value of reacted resin=Acid value of varnish/proportion of reacted resin in varnish.

The proportion of the reacted resin is as follows:

(Amount of resin+amount of ALCH+amount of isostearic acid)/amount of varnish, or (Amount of resin+amount of ALCH+amount of NISSAN FINE OXOCOL)/amount of varnish.

Stability of the emulsion was evaluated in the following manner. The emulsion ink prepared was subjected to 10 cycles of treatments, one cycle of which comprised leaving the ink in a programmed thermostat at 50° C. for 24 hours, then cooling to −20° C. over a period of 24 hours, leaving at this temperature for 24 hours, and then again heating to 50° C. over a period of 24 hours. The stability was evaluated by the difference between the initial viscosity and the viscosity of the ink after subjected to 10 cycles of the treatments.

Moreover, the ink was charged in a stencil printing machine RISOGRAPH (registered trademark) GR377, and a master perforated using an original of 50% in percentage of letters (checkered pattern) was mounted on a printing drum. Printing of 300 copies was conducted to make the system steady. Thereafter, the printing machine was left to stand for 2 weeks in an environment at 23° C., and the subsequent printing state was evaluated by observing every 10th copy with the naked eye.

COMPARATIVE EXAMPLE 1

An ink was prepared in the same manner as in Example 1, except that the aluminum chelate compound was added without carrying out the reaction under heating.

COMPARATIVE EXAMPLE 2

An ink was prepared in the same manner as in Example 1, except that the varnish was prepared by stirring 10.5 parts of the resin used in Example 1 and 3.0 parts of AF-5 under the heatings without the aluminum chelate compound.

COMPARATIVE EXAMPLE 3

An ink was prepared in the same manner as in Example 1, except that the initial heating temperature was 60° C., and the reaction temperature at the time of stirring with heating after the addition of the aluminum chelate compound was 60–70° C.

EXAMPLE 2

An ink was prepared in the same manner as in Example 1, except that the initial heating temperature was 120° C., and the reaction temperature at the time of stirring with heating after the addition of the aluminum chelate compound was 120–130° C.

EXAMPLE 3

An ink was prepared in the same manner as in Example 1, except that the reaction time at the stirring with heating after the addition of the aluminum chelate compound was 60 minutes.

EXAMPLE 4

An ink was prepared in the same manner as in Example 1, except that the reaction time at the stirring with heating after the addition of the aluminum chelate compound was 90 minutes.

EXAMPLE 5

An ink was prepared in the same manner as in Example 1, except that the reaction time at the stirring with heating after the addition of the aluminum chelate compound was 150 minutes.

TABLE 1

| Example No. | Formulation of varnish | Heating condition of the varnish | Viscosity of the varnish | Acid value of resin or reacted resin | Stability of emulsion (Pa · s) (Before test:After test) |
|---|---|---|---|---|---|
| Example 1 | Resin 10.5 parts Solvent 3.0 parts ALCH 0.315 part | 170–180° C. 30 min | 620 cp | 8.6 | 13.2:14.5 |
| Comparative Example 1 | Resin 10.5 parts Solvent 3.0 parts ALCH 0.315 part | Not heated | 280 cp | 15.0 | 12.5:Separation |
| Comparative Example 2 | Resin 10.5 parts Solvent 3.0 parts | 170–180° C. 30 min | 280 cp | 15.0 | 12.4:Separation |
| Comparative Example 3 | Resin 10.5 parts Solvent 3.0 parts ALCH 0.315 part | 60–70° C. 30 min | 290 cp | 11.3 | 12.8:6.0 |
| Example 2 | ditto | 120–130° C. 30 min | 400 cp | 10.0 | 13.8:12.0 |
| Example 3 | ditto | 170–180° C. 60 min | 740 cp | 8.5 | 13.8:14.7 |
| Example 4 | ditto | 170–180° C. 90 min | 900 cp | 8.2 | 14.0:15.1 |

TABLE 1-continued

| Example No. | Formulation of varnish | Heating condition of the varnish | Viscosity of the varnish | Acid value of resin or reacted resin | Stability of emulsion (Pa · s) (Before test:After test) |
|---|---|---|---|---|---|
| Example 5 | ditto | 170–180° C. 150 min | 1200 cp | 7.6 | 14.2:15.4 |

Note) In the above table, "separation" means that the emulsion separated into a water phase and an oil phase, and viscosity could not be measured. "Acid value" is a value in terms of the resin produced by the reaction in the varnish.

As can be seen from Table 1, even if the aluminum chelate compound was added, stability of the emulsion was inferior when the aluminum compound was merely added without heating (Comparative Example 1), and when the aluminum chelate compound was not used (Comparative Example 2). Moreover, when the reaction temperature was 170–180° C. (Examples 1 and 3–5), the acid value of the varnish was 9 or less and stability of the emulsion was conspicuously improved.

COMPARATIVE EXAMPLE 4

8.0 Parts of a rosin-modified phenolic resin having a weight-average molecular weight of 10000 was dissolved with heating in 12.0 parts of the solvent AF-5 SOLVENT to obtain a varnish. To 13.0 parts of this varnish were added 13.0 parts of AF-5 SOLVENT and 2 parts of sorbitan monooleate as a surface active agent, followed by dispersing therein 7 parts of a pigment (furnace carbon black) to obtain an oil phase.

Furthermore, to this oil phase was added 65.0 parts in total of a water phase comprising 59.0 parts of deionized water and 6.0 parts of ethylene glycol, and emulsification was carried out to obtain a water-in-oil emulsion ink for stencil printing.

EXAMPLE 6

A varnish was obtained using the same materials and at the same ratio as in Comparative Example 4. Then, an aluminum chelate compound ALCH was added thereto so that the proportion of the aluminum chelate compound was 3 wt % based on the resin, and the mixture was stirred under heating with keeping the reaction temperature at 170–180° C. to progress the reaction for 30 minutes. Then, an ink was prepared using this varnish in the same manner as in Comparative Example 3.

by the reaction with the aluminum chelate compound, resulting in stabilization of the emulsion of the ink.

EXAMPLE 7

An ink was prepared in the same manner as in Example 1, except that isostearic acid in an amount of 0.5 mol based on the aluminum chelate compound ALCH was added together with ALCH and the reaction was carried out.

EXAMPLE 8

An ink was prepared in the same manner as in Example 7, except that the amount of isostearic acid added was 1.0 mol.

EXAMPLE 9

An ink was prepared in the same manner as in Example 7, except that the amount of isostearic acid added was 2.0 mols.

EXAMPLE 10

An ink was prepared in the same manner as in Example 7, except that the amount of isostearic acid added was 2.5 mols.

COMPARATIVE EXAMPLE 5

An ink was prepared in the same manner as in Example 7, except that the amount of isostearic acid added was 3.0 mols.

EXAMPLE 11

An ink was prepared in the same manner as in Example 1, except that isostearyl alcohol (trademark: NISSAN FINE OXOCOL 180 manufactured by Nissan Chemical Industries, Ltd.) in an amount of 0.5 mol based on the

TABLE 2

| Example No. | Formulation of varnish | Heating condition of the varnish | Viscosity of the varnish | Acid value of resin or reacted resin | Stability of emulsion (Pa · s) (Before test:After test) |
|---|---|---|---|---|---|
| Comparative Example 4 | Resin 8.0 parts Solvent 12.0 parts | 170–180° C. 30 min | 14200 cp | 19.0 | 13.5:Separation |
| Example 6 | Resin 8.0 parts Solvent 12.0 parts ALCH 0.24 part | 170–180° C. 30 min | 75500 cp | 10.0 | 14.1:15.2 |

Note) In TABLE 2, "separation" means that the emulsion separated into a water phase and an oil phase and viscosity could not be measured, and "acid value" is a value in terms of the resin produced by the reaction in the varnish.

It can be seen from Table 2 that as in the case of the alkyd resin, the rosin-modified resin also decreased in acid value aluminum chelate compound ALCH was added together with ALCH and the reaction was carried out.

EXAMPLE 12

An ink was prepared in the same manner as in Example 11, except that the amount of isostearyl alcohol was 1.0 mol.

EXAMPLE 13

An ink was prepared in the same manner as in Example 11, except that the amount of isostearyl alcohol was 2.0 mols.

EXAMPLE 14

An ink was prepared in the same manner as in Example 11, except that the amount of isostearyl alcohol was 2.5 mols.

COMPARATIVE EXAMPLE 6

An ink was prepared in the same manner as in Example 11, except that the amount of isostearyl alcohol was 3.0 mols.

TABLE 3

| Example No. | Formulation of varnish | Addition amount of isostearic acid | Viscosity of the varnish | Acid value of resin or reacted resin | Stability of emulsion (Pa · s) (Before test:After test) |
|---|---|---|---|---|---|
| Example 1 | Resin 10.5 parts Solvent 3.0 parts ALCH 0.315 part | No | 620 cp | 8.6 | 13.2:14.5 |
| Example 7 | ditto | 0.5 mol per ALCH | 950 cp | 9.0 | 13.2:13.3 |
| Example 8 | ditto | 1.0 mol per ALCH | 1000 cp | 9.4 | 13.4:13.5 |
| Example 9 | ditto | 2.0 mol per ALCH | 1030 cp | 9.8 | 13.6:13.3 |
| Example 10 | ditto | 2.5 mol per ALCH | 1020 cp | 10.0 | 13.5:13.4 |
| Comparative Example 5 | ditto | 3.0 mol per ALCH | 990 cp | 10.4 | 13.2:9.0 |

Note) "Acid value" is a value in terms of the resin produced by the reaction in the varnish.

TABLE 4

| Example No. | Formulation of varnish | Addition amount of NISSAN FINE OXOCOL | Viscosity of the varnish | Acid value of resin or reacted resin | Stability of emulsion (Pa · s) (Before test:After test) |
|---|---|---|---|---|---|
| Example 11 | Resin 10.5 parts Solvent 3.0 parts ALCH 0.315 part | 0.5 mol per ALCH | 760 cp | 8.9 | 13.3:13.1 |
| Example 12 | ditto | 1.0 mol per ALCH | 830 cp | 9.0 | 13.5:13.5 |
| Example 13 | ditto | 2.0 mol per ALCH | 830 cp | 8.9 | 13.7:13.6 |
| Example 14 | ditto | 2.5 mol per ALCH | 850 cp | 8.9 | 13.2:13.1 |
| Comparative Example 6 | ditto | 3.0 mol per ALCH | 820 cp | 8.8 | 13.4:8.0 |

Note) "Acid value" is a value in terms of the resin produced by the reaction in the varnish.

TABLE 5

| Example No. | State of starting of printing |
|---|---|
| Example 1 | Blur occurred until 100th copy |
| Example 7 | Blur did not occur after 30th copy |
| Example 8 | Blur did not occur after 20th copy |
| Example 9 | Blur did not occur after 10th copy |
| Example 10 | ditto |
| Comparative Example 5 | ditto |
| Example 11 | Blur did not occur after 40th copy |
| Example 12 | Blur did not occur after 20th copy |
| Example 13 | Blur did not occur after 10th copy |
| Example 14 | ditto |
| Comparative Example 6 | ditto |

It can be seen from Tables 3–5 that increase of viscosity of ink when left to stand can be diminished, and printing can be rapidly started even after the printing machine has not been used for a long period of time, by reacting an aluminum chelate compound with an alkyd resin in the presence of a higher fatty acid or a higher alcohol.

According to the present invention, a varnish containing as a resinous component a reaction product of an aluminum chelate compound or an aluminum alcoholate with an alkyd resin or a rosin-modified resin is prepared, and an emulsion ink is prepared using this varnish as an oil phase, and, therefore, the ink emulsion is markedly improved in storage stability. Furthermore, by adding a higher fatty acid or a higher alcohol at the stage of the reaction of the resinous component, increase of viscosity of the ink caused when the ink is left to stand can be inhibited. As a result, even if the ink is left in a printing machine for a long time, the prints rapidly reach the desired printing density after trial printing of a small number of prints at the time of starting of printing.

What is claimed is:

1. A water-in-oil (W/O) emulsion ink for stencil printing having an oil phase and a water phase, in which said oil phase contains a reaction product of an aluminum chelate compound or an aluminum alcoholate with an alkyd resin or a rosin-modified resin.

2. An emulsion ink for stencil printing according to claim 1, wherein said reaction product is obtained by heating said aluminum chelate compound or aluminum alcoholate with said alkyd resin or rosin-modified resin to a temperature sufficient to lower an acid value of said resin.

3. An emulsion ink for stencil printing according to claim 2, wherein said reaction product has an acid value of 10 or less.

4. An emulsion ink for stencil printing according to claim 1, wherein said reaction product is obtained by a reaction in a presence of a higher fatty acid or a higher alcohol.

5. An emulsion ink for stencil printing according to claim 4, wherein said higher fatty acid or higher alcohol is in an amount of 0.5–2.5 mols per 1 mol of said aluminum chelate compound or aluminum alcoholate.

6. A water-in-oil (W/O) emulsion ink for stencil printing having an oil phase and a water phase, in which said oil phase contains an alkyd resin or rosin-modified resin having an acid value of 10 or less.

7. An emulsion ink for stencil printing according to claim 6, wherein said alkyd resin or rosin-modified resin is a reaction product of an aluminum chelate compound or an aluminum alcoholate with an alkyd resin or a rosin-modified resin.

8. A method of preparing a water-in-oil (W/O) emulsion ink for stencil printing comprising:

mixing an aluminum chelate compound or an aluminum alcoholate with an alkyd resin or a rosin-modified resin;

heating the mixture to form a reaction product; and forming an emulsion from a water phase and an oil phase including the reaction product.

9. The method of claim 8, further comprising adding the water phase dropwise to the oil phase.

10. The method of claim 8, wherein the mixture is heated for 15–200 minutes at 100–200° C.

11. The method of claim 8, wherein the reaction product has an acid value of 10 or less.

12. The method of claim 8, wherein mixture includes a higher fatty acid or a higher alcohol.

* * * * *